United States Patent
Merriman

(10) Patent No.: US 10,330,113 B2
(45) Date of Patent: Jun. 25, 2019

(54) METHOD OF MANUFACTURING A GAS TURBINE ENGINE

(71) Applicant: ROLLS-ROYCE plc, London (GB)

(72) Inventor: Nicholas M Merriman, Derby (GB)

(73) Assignee: ROLLS-ROYCE plc, London (GB)

( * ) Notice: Subject to any disclaimer, the term of this patent is extended or adjusted under 35 U.S.C. 154(b) by 328 days.

(21) Appl. No.: 15/234,898

(22) Filed: Aug. 11, 2016

(65) Prior Publication Data

US 2017/0159671 A1 Jun. 8, 2017

(30) Foreign Application Priority Data

Sep. 9, 2015 (GB) .................................. 1515934.6

(51) Int. Cl.
| | | |
|---|---|---|
| *F04D 29/38* | (2006.01) | |
| *F01D 11/12* | (2006.01) | |
| *F01D 11/08* | (2006.01) | |
| *F01D 5/20* | (2006.01) | |
| *F04D 19/00* | (2006.01) | |

(52) U.S. Cl.
CPC ............. *F04D 29/388* (2013.01); *F01D 5/20* (2013.01); *F01D 11/08* (2013.01); *F01D 11/12* (2013.01); *F04D 19/002* (2013.01); *F05D 2220/36* (2013.01); *F05D 2230/10* (2013.01); *Y02T 50/672* (2013.01); *Y02T 50/673* (2013.01)

(58) Field of Classification Search
CPC . F01D 5/20; F01D 11/08; F01D 11/12; F04D 19/002; F04D 29/388; F04D 29/526; F05D 2220/36; F05D 2230/10; Y02T 50/672; Y02T 50/673
See application file for complete search history.

(56) References Cited

U.S. PATENT DOCUMENTS

| | | | | |
|---|---|---|---|---|
| 4,501,095 A | * | 2/1985 | Drinkuth | ................. B24B 19/14 29/889.2 |
| 4,512,115 A | * | 4/1985 | Miller | ..................... B24B 19/14 29/404 |
| 2005/0111967 A1 | | 5/2005 | Couture et al. | |
| 2007/0147989 A1 | * | 6/2007 | Collins | ................... F01D 11/02 415/173.1 |
| 2010/0266384 A1 | * | 10/2010 | Evans | ................... F01D 21/045 415/9 |
| 2015/0118941 A1 | | 4/2015 | Genz et al. | |

OTHER PUBLICATIONS

Jan. 29, 2016 Search Report issued in British Patent Application No. 1515934.6.

* cited by examiner

*Primary Examiner* — Richard A Edgar
(74) *Attorney, Agent, or Firm* — Oliff PLC

(57) ABSTRACT

A method of manufacturing a gas turbine engine, the method including providing a fan having a plurality of fan blades circumscribed by a fan track liner and attaching a cutter to the fan track liner, the cutter is arranged towards the blades of the fan. The fan blades are rotated so that one or more of the fan blades are trimmed by the cutter. Once one or more of the fan blades have been trimmed by a desired amount, the cutter is removed from the fan track liner.

10 Claims, 2 Drawing Sheets

METHOD OF MANUFACTURING A GAS TURBINE ENGINE

TECHNICAL FIELD

The present disclosure concerns a method of manufacturing a gas turbine engine, and/or a gas turbine engine assembly.

BACKGROUND

Turbofan gas turbine engines (which may be referred to simply as 'turbofans') are typically employed to power aircraft. Typically a turbofan gas turbine engine will comprise an axial fan driven by an engine core. The engine core is generally made up of one or more turbines which drive respective compressors. The fan is usually driven off an additional lower pressure turbine in the engine core.

The fan comprises an array of radially extending fan blades mounted on a rotor. The fan is surrounded by a fan casing. Generally the fan casing includes a fan track liner positioned so as to circumscribe the fan blades and be proximal thereto.

The precise arrangement of the fan track liner will depend on the engine type and the type of blades used, e.g. metallic or composite blades. However, generally the fan track liner has, in circumferential layers, an abradable layer, an intermediate layer (e.g. an aluminium honeycomb layer), and a septum layer. The septum layer acts as a bonding, separation, and load spreading layer between the abradable layer and the intermediate layer.

Tips of the fan blades are intended to pass as close as possible to the abradable layer when rotating. To achieve this, the abradable layer is dimensioned such that at engine pass-off (i.e. running of the engine before entry into service) one or more of the fan blades cuts a path in the abradable layer so as to achieve a minimal average clearance between the fan blade tips and the fan track liner panel. Typically, the longest fan blades will rub and abrade away the liner by differing amounts over the full 360 degrees circumference, when the engine is operating at its highest power setting. This process advantageously trues the casing and removes any casing asymmetries so as to permit the longest fan blade to run at zero clearance around the circumference of the casing when the engine is running at its highest power setting.

Often the cutting of the path in the abradable layer is done by a single blade tip due to the variation in maximum radial extent of the fan blades. In the present application, maximum radial extent refers to the distance of the tip of the blade from the rotational axis of the fan. The variation in the maximum radial extent of the blades can be attributed to a number of factors including by way of example only, blade length, blade to blade centrifugal growth variation, and in a slotted fan, the disc root slot radial location, and/or the blade retention system. Due to the number of factors that influence the radial extent of the blades further reducing the variation in length during the manufacturing process would be expensive.

It is known for other rotating blades (e.g. blades of the intermediate pressure and high pressure compressor) of a gas turbine engine to grind the blade tips using a blade tip grinding machine that receives the assembled rotary component. The tips of the blades are ground using the machine and then the rotary component is assembled to the remainder of the gas turbine engine. Given the size of the fan compared to the intermediate and high pressure compressor, a much larger and more expensive blade grinding machine would be needed for a fan than for a compressor.

SUMMARY

The present disclosure seeks to provide a method of minimising the variation in maximum blade radial extent without the need for a large costly grinding machine and/or without the need to optimise multiple manufacturing process variables.

According to a first aspect there is provided a method of manufacturing a gas turbine engine, the method comprising providing a fan having a plurality of fan blades circumscribed by a fan track liner. A cutter is attached to the fan track liner, the cutter being arranged towards the blades of the fan. The fan blades are rotated so that one or more of the fan blades are trimmed by the cutter. Once one or more of the fan blades have been trimmed by a desired amount, the cutter is removed from the fan track liner.

The cutter may be attached to protrude from the fan track liner. Alternatively, the cutter may be attached at a radial position such that the cutter does not protrude from the fan track liner. For example, the fan track liner may have an abradable layer, and the cutter may be exposed once at least a portion of the abradable layer has been removed by one or more of the fan blades.

The cutter may be inserted into the fan track liner.

The cutter may be attached to the fan track liner using a securing device, for example, a bolting arrangement, a clamp arrangement, and/or a clip arrangement.

The fan track liner may comprise a plurality of panels arranged to define an annulus. The panels may be circumferentially adjacent. The cutter may be inserted at a location between two adjacent panels.

The cutter may extend axially from a position axially aligned with a leading edge of the blades to a position axially aligned with a trailing edge of the blades.

The cutter may be configured to trim the one or more blades by machining or grinding.

The cutter may comprise a cutting edge for machining the tips of one or more fan blades.

The cutter may comprise an abrasive grit cutting surface for trimming the blades by grinding.

Once the cutter has been removed, the method may comprise adding a filler material in the region the cutter was positioned prior to being removed from the fan track liner.

The radial position of the cutter may be set such that at a maximum engine pass-off speed all of the tips of the blades are machined, and when the fan track liner comprises an abradable layer, the desired depth of cut in the abradable is achieved.

The fan track liner may comprise an abradable layer proximal to the fan blades.

The fan blade may comprise a tip that can abrade the abradable layer of the fan track liner.

According to a second aspect there is provided a gas turbine engine assembly comprising a fan having a plurality of fan blades arranged around a hub, and a fan casing having a fan track liner circumscribing the fan. A removable cutter is arranged towards the fan blades for trimming the radial length of one or more fan blades.

According to a third aspect there is provided a gas turbine engine comprising a fan having a plurality of fan blades arranged around a hub; and a fan casing having a fan track liner circumscribing the fan. The variation in maximum radial extent of the fan blades is less than or equal to ±0.2 mm, e.g. less than or equal to ±0.1 mm.

The maximum radial extent of the fan blade in the present application refers to the position of the tip of the fan blade with respect to the rotational axis of the fan.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
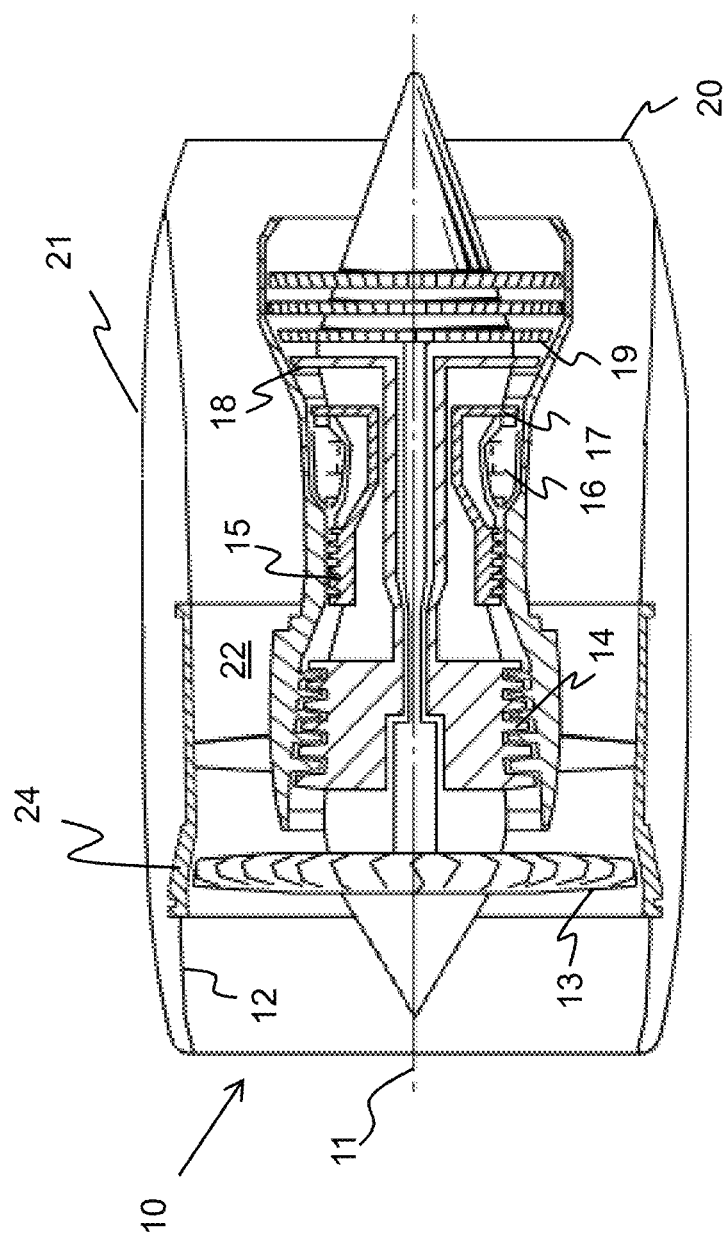
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
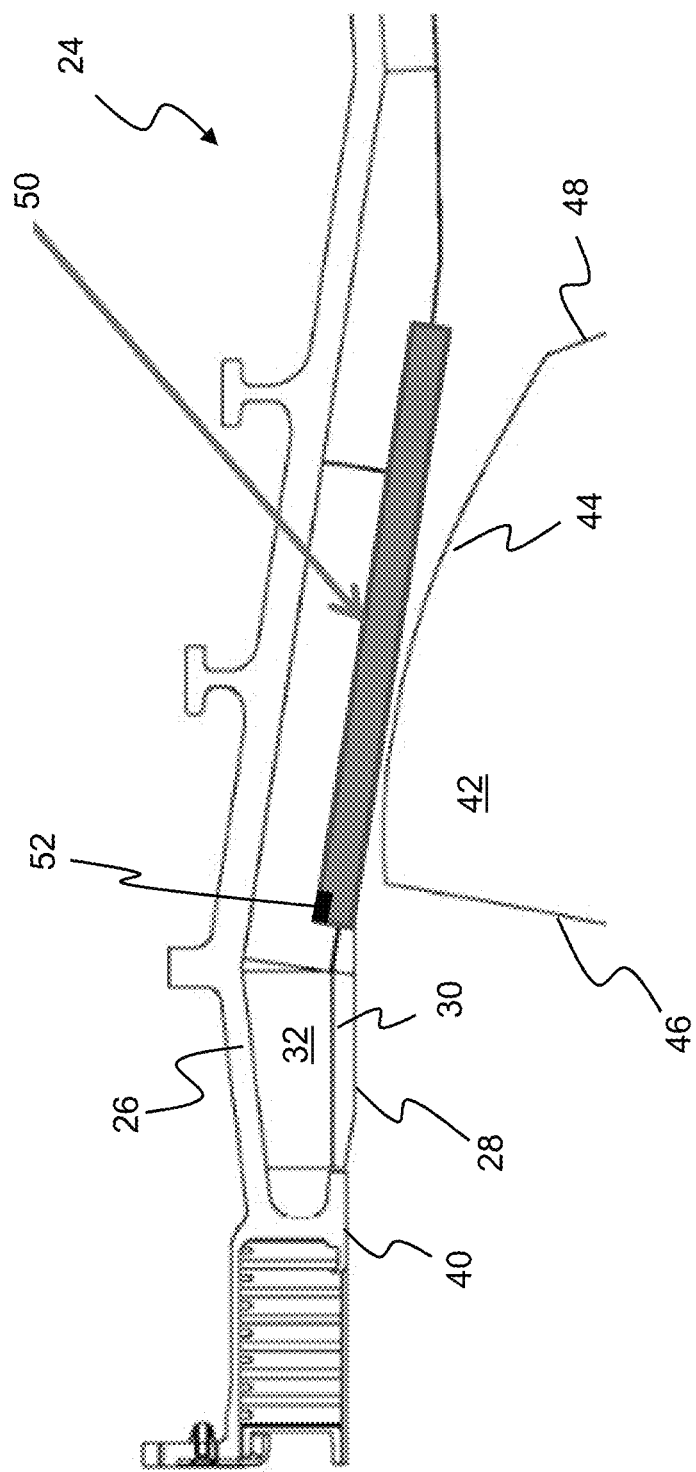
FIG. 2 is a sectional view through a fan track liner of the gas turbine engine of FIG. 1 prior to the engine being in service.

Referring now to FIG. 2, a fan casing assembly 24 that circumscribes the fan 13 includes an annular fan case 26. A fan track liner is attached to the fan case 26. In this example the fan track liner is attached using adhesive but in alternative embodiments the fan track liner may be mechanically attached to the fan case. The fan track liner includes an abradable layer 28 that is proximal to fan blades 42 of the fan 13. The fan track liner also has an intermediate layer 32, which in this example is an aluminium honeycomb structure. A septum layer 30 is provided between the intermediate layer and the abradable layer.

The fan case 26 includes a hook 40 that extends radially inwardly from the fan case and extends axially inwardly. In operation, in a failure event, if a fan blade 42 is released from the fan 13 the blade will crush/deform the fan track liner and will impact the hook. The hook stops the blade from exiting the engine. The use of a hook is just one example of a method of containing fan blades in a failure event, and the skilled person will appreciate that the method of manufacturing a blade that will later be described is applicable to other types of fan case assemblies.

Each blade 42 of the fan has a leading edge 46, a trailing edge 48 and a tip 44. In this example, the tip 44 is configured such that it is capable of abrading the abradable layer 28 of the fan track liner, e.g. the tip may be made from a metallic material (e.g. titanium) and the abradable layer may be made from an epoxy resin.

Before the gas turbine engine enters into service and after it has been assembled, the engine goes through a "pass-off test", where the engine is run and various criteria are tested.

The present disclosure proposes at the time of the engine pass-off test, reducing the variation in maximum radial extent of the fan blades so as to reduce clearance between all fan blades and the fan track liner.

To reduce the variation in radial extent of the fan blades it is proposed to trim the ends of blades where required. To do this a cutter 50 is inserted into the fan track liner. The cutter 50 is temporarily inserted into the fan track liner and as such is removeable from the fan track liner.

In the present example, the fan track liner is defined by a plurality of arcuate panels that are positioned adjacent to each other so as to define an annulus. The cutter 50 is inserted between two adjacent panels. The cutter extends in an axial direction between the two adjacent panels. A securing device 52 is provided to attach the cutter 50 in position. The securing device may be a bolting arrangement, a clamping arrangement, or a clip arrangement.

In the present example the cutter 50 extends radially through the abradable layer, the septum layer and the honeycomb layer, but for example, it may only extend through the abradable layer. The cutter is arranged to protrude radially inward from the fan track liner towards the tip 44 of the fan blades 42.

The cutter 50 may be a cutting edge for machining the fan blades or it may include an abrasive grit for grinding the fan blades. In each case the circumferential width of the cutter is minimal, such that the majority of the fan track liner is undisturbed by the presence of the cutter, and/or the cutter fits within the gap between adjacent fan track liner panels.

The cutter 50 is arranged so as to extend from a position axially aligned with a leading edge 46 of the fan blades 42 to a position axially aligned with a trailing edge 48 of the fan blades. In this way, the cutter 50 is capable of trimming a fan blade along the entire tip in a chordwise direction.

The cutter 50 is positioned to extend radially inwardly from the fan track liner by a distance that will trim the blades for optimal aerodynamic performance at maximum engine pass-off speed. Maximum engine pass-off speed varies between different engine types.

Once the cutter is in position, the pass off test is run. When the engine accelerates for the first time, as the fan speed approaches for example 85% of maximum pass-off speed the tips 44 of the blades 42 will begin to contact the cutter and be trimmed by the cutter. The cutter continues to trim the blades up to the maximum pass-off speed.

Once the pass-off test is complete, the cutter 50 is removed from the fan track liner. Filler (e.g. epoxy resin) is used to fill in the gap between the two fan track liner panels where the cutter was positioned.

The use of the cutter 50 during the engine pass-off test means that the variation in radial extent of the fan blades 42 can be reduced without the need to increase process control on the length of blades during production and/or further control blade-to-blade centrifugal growth. In the case of fans with slotted blades (e.g. as opposed to blisks) the cutter also reduces the need to further control the radial location of the disc root slot, and/or to further control the retention system. The method also achieves reduced variation in blade radial extent without the need for large expensive and complicated additional equipment, e.g. a blade tip grinding machine. The variation in maximum radial extent may be reduced to be less than or equal to ±0.2 mm, or less than or equal to ±0.1 mm.

In the present example, the blade 42 is a titanium blade, but in alternative embodiments the blade may be made from an alternative material. For example, the blade may be a composite blade with a metallic tip. In further examples, the tip may be a different material to the majority of the metallic or composite blade material and may be selected so that it is more easily trimmed by the cutter but still be capable of abrading the abradable layer of the fan track liner.

In the described example the cutter 50 was attached to the fan track liner between adjacent fan track liner panels, but in alternative embodiments the cutter may be attached at any suitable position.

In the described example the cutter is arranged to protrude from the fan track liner panel when the gas turbine engine assembly is first assembled prior to engine pass-off. However, in alternative embodiments the cutter may initially not protrude from the fan track liner. In such an example, the radially inner surface of the abradable layer may be positioned more radially inward than the cutting surface or edge of the cutter. During engine pass off, one or more of the fan blades may remove a portion of the abradable layer so as to expose the cutting surface or cutting edge of the cutter.

In the described example a single cutter is provided, but in alternative embodiments a plurality of cutters may be provided at a plurality of circumferential positions.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of manufacturing a gas turbine engine, the method comprising:
   providing a fan having a plurality of fan blades circumscribed by a fan track liner;
   attaching a cutter to the fan track liner, the cutter being arranged towards the blades of the fan;
   trimming the fan blades with the cutter by rotating the fan blades;
   removing the cutter from the fan track liner upon the fan blades being trimmed; and
   once the cutter has been removed, adding a filler material in a region that the cutter was positioned.

2. The method according to claim 1, wherein the cutter is inserted into the fan track liner.

3. The method according to claim 1, wherein the cutter extends axially from a position axially aligned with a leading edge of the fan blades to a position axially aligned with a trailing edge of the fan blades.

4. The method according to claim 1, wherein the cutter is configured to trim the one or more fan blades by machining or grinding.

5. The method according to claim 4, wherein the cutter includes a cutting edge for machining tips of the one or more fan blades.

6. The method according to claim 4, wherein the cutter includes an abrasive grit cutting surface for trimming the fan blades by grinding.

7. The method according to claim 1, wherein the fan track liner includes an abradable layer proximal to the fan blades.

8. The method according to claim 7, wherein the fan blade includes a tip that abrades the abradable layer of the fan track liner.

9. A gas turbine engine assembly comprising:
   a fan having a plurality of fan blades arranged around a hub, at least one fan blade of the plurality of fan blades having been trimmed along a radial length by a removable cutter during a trimming process; and
   a fan casing having a fan track liner circumscribing the fan, the fan track liner including a filler material in a region where the removable cutter was positioned during the trimming process.

10. The gas turbine engine assembly of claim 9, wherein a variation in maximum radial extent of the fan blades is less than or equal to ±0.2 mm.

* * * * *